Jan. 9, 1968　　　SENTARO MIYAWAKI　　　3,362,636
BIMETAL STEAM TRAP
Filed July 12, 1966　　　　　　　　　　　　4 Sheets-Sheet 1
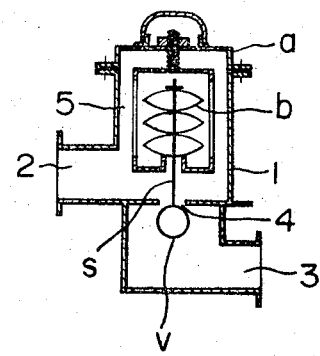
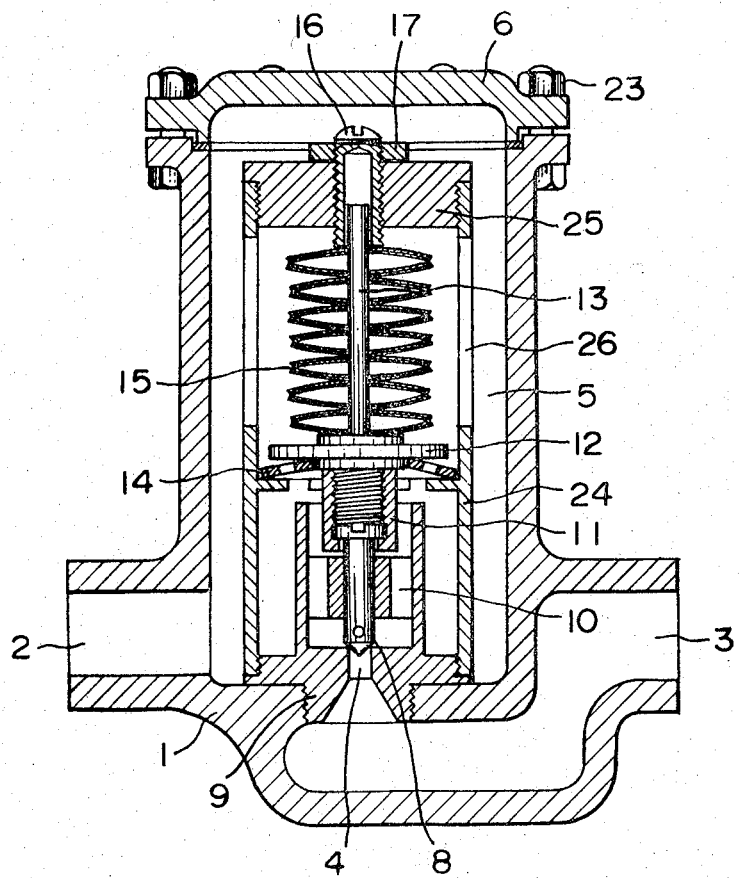

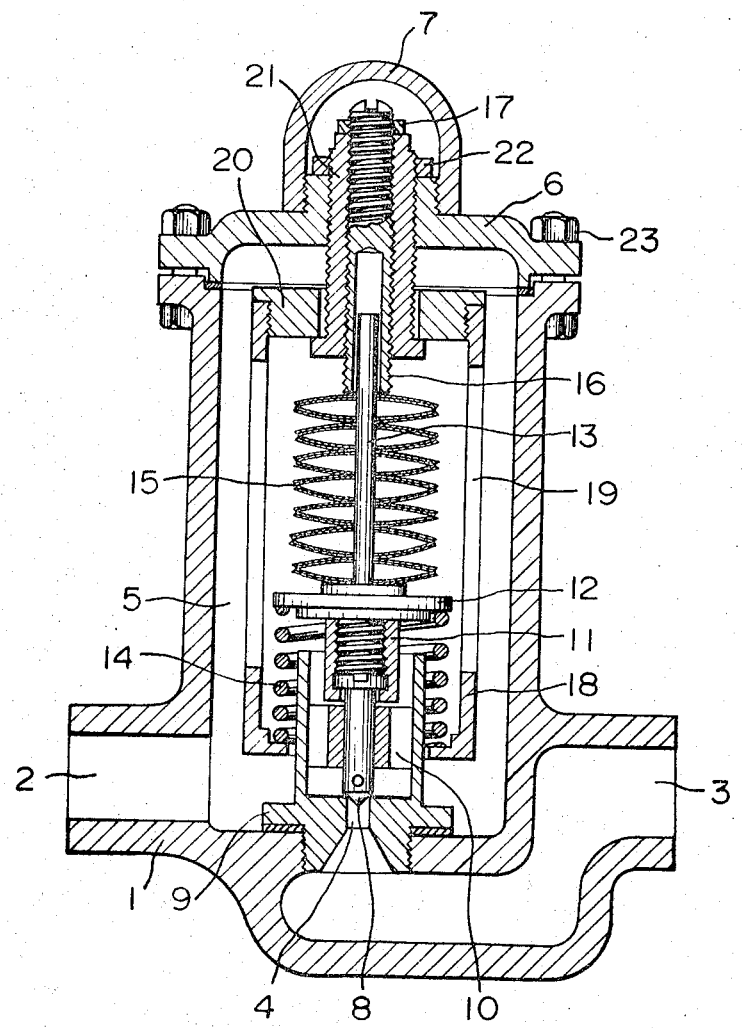

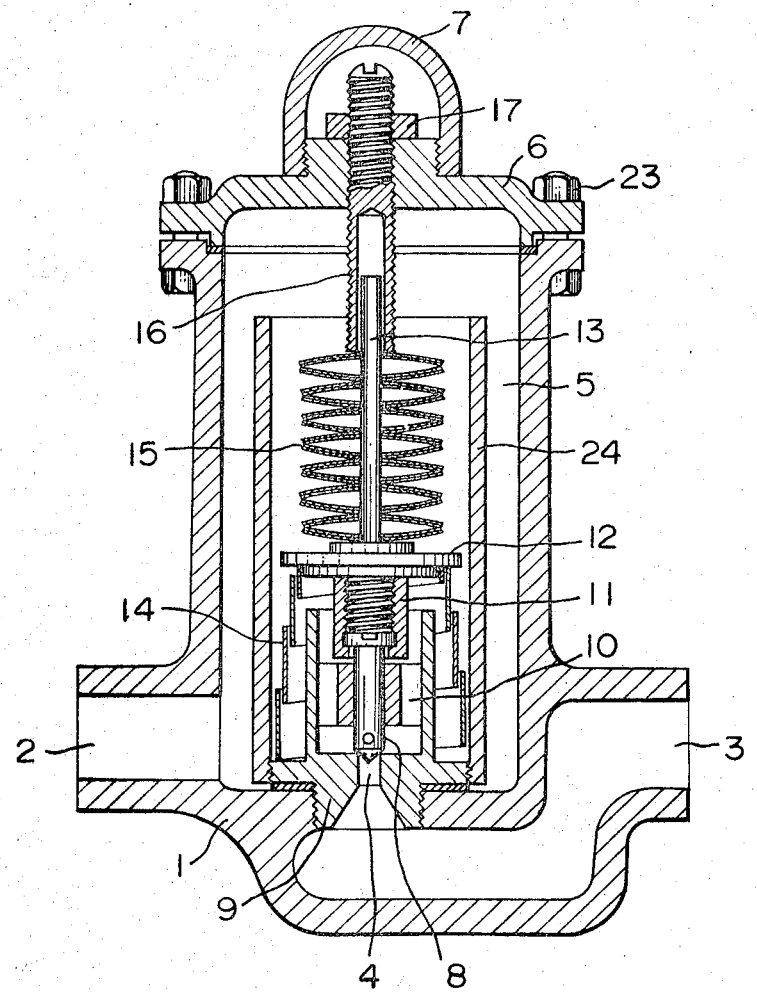

United States Patent Office 3,362,636
Patented Jan. 9, 1968

3,362,636
BIMETAL STEAM TRAP
Sentaro Miyawaki, 549 Midorigaoka, Oaza-Tarumi,
Suita, Osaka-fu, Japan
Filed July 12, 1966, Ser. No. 564,682
Claims priority, application Japan, July 21, 1965,
40/44,315
3 Claims. (Cl. 236—59)

ABSTRACT OF THE DISCLOSURE

A high pressure steam trap comprising a casing having a partitioning wall dividing the interior space thereof into two portions which communicate with each other through a valve port formed therein, a valve member adapted to close the valve port from the inlet side of the trap in response to steam pressure acting thereon, a spring member biasing the valve away from the valve port and a temperature-sensitive bimetal unit adapted to apply a temperature-responsive force to said valve to open or close the valve port.

---

This invention relates to an improved bimetal steam trap, more particularly to an improved bimetal steam trap, which is suitable for use under high pressure.

A bimetal steam trap which has been commonly used heretofore comprises a valve portion including inlet and outlet openings communicated through a valve port, a valve stem extending through the valve port, a temperature responsive bimetal unit secured to the inlet side end of the valve stem, and a valve head secured to the outlet side end of said valve stem, so that the valve head may be brought into direct contact with the valve port from the outlet side of the valve portion.

In order to apply a bimetal steam trap of such conventional construction to a high pressure steam piping system, it has been necessary to solve at least the following shortcomings of the bimetal steam trap.

(1) The valve head is exposed to direct impact of high pressure drain jets striking its surface after leaking through gaps at the valve port, and hence, the durability of the steam trap has been rather poor and laborious maintenance work has been required.

(2) As the pressure of the steam piping system, or the pressure difference between the inlet side and the outlet side of the valve port of a steam trap, is increased, the magnitude of the operative force acting on the valve stem of the steam trap is also increased in a direction to open the valve port, and accordingly, the mechanical force generated by the temperature- sensitive bimetal unit should be large enough to retain the valve port closed by overcoming said operative force due to pressure difference in a direction to open the valve port.

(3) In order to generate such a large mechanical force, the number of bimetal elements to be laminated in the temperature-sensitive bimetal unit is usually increased to make the steam trap bulky and expensive.

(4) When the valve head is brought into the close vicinity of the valve port for closing the steam trap, the dynamic pressure of the drain and steam jet steam through the valve port acts to provide a high resistance against the tight contact between the valve head and the valve port, and sometimes vapour-tight closure of the valve portion of the steam trap cannot be obtained. Under such conditions, reliable and distinctive closing of the valve port has failed, and dripping of the drain or minute jet streams of the drain through the narrow gap between the valve head and the valve port are caused to increase erosion of the valve head and the valve port.

(5) Generally speaking, the amount of drain generated in a high pressure steam piping system is very small, and hence, only a comparatively small valve port is sufficient to discharge such drain of the piping system. However, in the case of a bimetal steam trap of the aforementioned conventional construction, the valve stem is adapted to extend through the valve port to necessitate a valve port having a cross-sectional area larger than that required for adequate discharge of the drain produced in the piping system. The effective steam pressure acting on the valve head in the direction to open the valve port is given by the following relation.

Total steam force acting on valve head to open the valve port = steam pressure × Effective transverse sectional area of valve port Thus, it is apparent that the increase in the valve port area results in a large steam force acting on the valve head in the direction to open the valve port, and hence, the bimetal unit must be provided with additional mechanical strength large enough for compensating said increase in the steam force to retain said valve head firmly at its closed position.

Besides, the fact that the amount of drain generated in the high pressure steam piping system is small makes the temperature variation of the piping system very slim and slow. Accordingly, the deflection of the bimetal unit for such a slight variation in temperature is also extremely small, and the gap produced by such deflection at the valve port of the steam trap is very narrow. If the drain should be generated in the piping system approximately at the same low rate as that of discharging it through the valve port, there can appear a thin but rapid drain jet stream penetrating through the narrow gap of the valve port to strike the valve head either continuously or intermittently for a substantially long period of time. Such drain jet streams cause considerable erosion on the surface of the valve head.

Furthermore, the aforementioned shortcomings associated with the conventional bimetal steam trap should be solved without sacrificing its cost and the durability.

The principal object of the invention is to obviate the above difficulties by providing a novel bimetal steam trap.

According to a preferred form of the invention, the valve head is so adapted as to be brought into contact with the valve port from the inlet side of the valve port by applying the effective steam pressure of the inlet side of the steam trap to the valve head in a direction to close the valve. A pring member is provided to apply an elastic force slightly in excess of the aforementioned effective steam pressure to the valve head in a direction opposite to said steam pressure, or in a direction to open said valve portion of the steam trap. The bimetal unit to be used in the steam trap of the invention is so adapted as to generate a temperature responsive deflective force in a direction to close the valve portion of the steam trap upon increase of the steam, or drain, temperature in excess of a certain predetermined level. Thereby, construction of such a bimetal unit can be greatly simplified, because it is sufficient to overcome the aforementioned slight excess of the spring force over the effective steam pressure acting on the valve head by means of the mechanical deflective force of the bimetal unit, whilst in the case of conventional bimetal steam traps, the entire effective steam pressure acting on the valve head has been fully compensated only by the mechanical deflective force of the temperature-sensitive bimetal unit.

Another object of the invention is to eliminate the excessive erosion of the valve head by the drain jet stream leaking through gaps at the valve port thereof.

Another object of the invention is to improve the durability of the valve portion of the bimetal steam trap by reducing the cross-sectional area of the valve port thereof by eliminating that portion of the valve stem which extends through the valve port.

Still further object of the invention is to provide a valve head so adapted as to be shifted always over a substantially large stroke once it is moved regardless of the amount of the drain generated in the steam piping system, so that closing and opening actions of the valve portion of the steam trap may be carried out in a reliable and distinctive manner.

Thus, the operation of the valve portion of the steam trap depends not only on the magnitude of the mechanical force of the bimetal unit, but also on the balance between the elastic force of the spring in a direction to open the valve port and the effective steam pressure acting on the valve head in a direction to close the valve port, which effective steam pressure is given by a product of the effective cross-sectional area of the valve port and the steam pressure at the inside space of the steam trap casing. The aforementioned elastic force of the spring is substantially independent of the pressure and temperature of the steam system, and if the steam pressure is varied considerably, then the aforementioned balance between the elastic force and the effective steam pressure is changed to cause an alteration in the operative characteristics of the steam trap. However, there have been also such alterations of the operative characteristics in the case of conventional bimetal steam traps, and besides, the magnitude of such variations of the operative characteristics is so small that they are not harmful at all for all practical purposes.

For a better understanding of the invention, reference is made to the accompanying drawings, in which;

FIG. 1 is a diagrammatic illustration of the skeleton of a typical bimetal steam trap which has been used heretofore for general purposes;

FIG. 2 is a vertical sectional view of a bimetal steam trap embodying the present invention, shown with its valve portion closed;

FIGS. 4 and 5 are vertical sectional views of other embodiments of the present invention.

Figure 3:
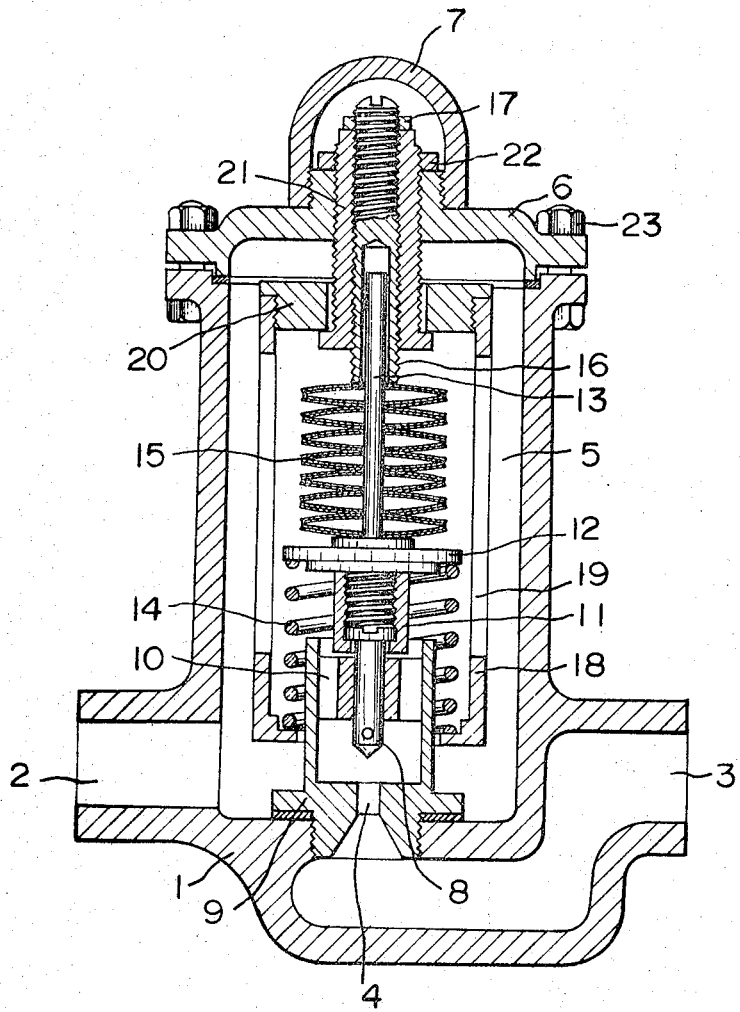
FIG. 3 is a vertical sectional view of the same, shown with its valve portion open.

Referring to FIG. 1 illustrating the construction of a typical bimetal steam trap known heretofore, the bimetal steam trap comprises a casing 1, an inlet opening 2, an outlet opening 3, a valve port 4, a drain chamber 5, a valve head $v$, a valve stem $S$, a bimetal unit $b$, and an adjustable bimetal unit holder $a$ necessary for achieving the desired operative characteristics responsive to the variation of the steam pressure and the steam or drain temperature of the steam piping system including the bimetal steam trap.

FIG. 2 illustrates a bimetal steam trap embodying the present invention shown with its valve portion closed, which includes a trap casing 1, an inlet opening 2, an outlet opening 3, a valve port 4 forming a partitioning wall in the passageway extending between the inlet opening and the outlet opening, a drain chamber 5 communicated with the valve port 4 for storing the drain temporarily on the inlet opening side of the valve port, a cover 6, a bonnet 7, a valve head 8, and a valve seat ring 9 so adapted as to act as guide member to receive guide wings 10 loosely fitted to the valve head 8 in a slidable manner to guide the movement of the latter. The valve head 8 is secured to the flange 12 by means of a connecting ring 11 screwed to the flange 12 so as to embrace the valve head. There is a valve stem 13 extending from the upper surface of the flange, as shown in the figure, and the flange 12 is biased upward by a spring 14 in a direction to open the valve portion of the steam trap by pushing up the valve head 8 away from the valve port 4, whilst a temperature-sensitive bimetal unit 15 is associated with the valve stem 13 so as to close the valve portion of the steam trap under normal pressure and temperature by pressing down the valve head 8 against the valve port 4. In order to guide the vertical reciprocative movement of the valve stem 13, a threaded guide cylinder 16 is screwed into an adjustable screw member 21 to be described hereinafter, so that the upper end portion of the valve stem 13 may be slidably received in the inside space of the guide cylinder 16. A nut 17 is provided for tightly securing the guide cylinder 16 to the adjustable screw member 21. The lower end of the spring 14 is supported by a holder 18 having a plurality of communicating windows 19, and the upper end of the holder 18 is connected securely to an upper end plate 20 by a suitable means, such as by screwing. The adjustable screw member 21 is also screwed into the upper end plate 20 in an adjustable manner. There are provided a securing nut 22 to fasten the adjustable screw member 21 at a desired postion after proper adjustment and a plurality of bolts and nuts 23 for fastening the cover 6 to the casing 1 of the steam trap.

In this particular embodiment of the invention, as shown in FIG. 2, when the valve portion of the steam trap is closed, the effective steam pressure acting on the valve head 8 in a direction to press it downward is given by a product of the effective area of the valve port 4 and the pressure difference between the inlet and outlet sides of the valve port, whilst the elastic biasing force of the spring 14 inserted between the spring holder 18 and the flange 12 is so selected as to slightly surpass said effective steam pressure acting on the valve head at the normal operating temperature of the steam trap. The laminated bimetal unit 15 comprises at least an inflated disk shaped bimetal element having a first metal plate of a low thermal expansion coefficient and placed inside of said inflated disk, and a second metal plate of a large thermal expansion coefficient which is laminated on the outside surface of said first metal plate. Such inflated disk shaped bimetal element or elements is so fitted to the valve stem 13 that when the temperature in the casing 1 is increased in excess of a certain predetermined value, the valve stem and accordingly the valve head 8 may be pressed downward to close the valve portion of the steam trap. The upper end surface of the bimetal unit 15 is supported by the lower end surface of the guide cylinder 16.

Thus, all the moving elements of the steam trap can be placed within the inside space of the spring holder 18 of the steam trap, and the opening stroke of the valve head 8 can be adjusted by rotating the adjustable screw member 21. The temperature-responsive operating characteristics of the laminated bimetal unit 15 can be adjusted by rotating the threaded guide cylinder 16 so as to select the proper initial conditions of the bimetal unit 15.

According to the principles of the present invention, it is permissible to form the aforementioned first and second metal plates of the bimetal unit 15 in a circular, rectangular, polygonal, or any other suitable shape. It is also apparent to those skilled in the art that the shape of the spring 14 is not limited to a coil as shown in the figure, but any other suitable shape, such as a leaf spring or a volute spring, can be also used for the same purpose.

Referring to FIG. 3, when the steam piping system including the steam trap of the invention is going to be started, the temperature and the pressure of the inside space of the drain chamber 5 of the steam trap casing 1 are low, and each bimetal element is flattened to cause the laminated bimetal unit 15 to shrink to its shortened position. Accordingly, there is not enough force acting on the flange 12 to contract the spring 14, and hence the valve stem 13 is pushed upward together with the valve head 8 by means of the elastic force of the spring 14. Thus, the liquid phase drain at a low temperature is extracted from the piping system through the valve port 4 and the outlet opening 3.

As the drain of low temperature is extracted, the temperature of the drain at the drain chamber 5 of the steam trap is increased to expand the laminated bimetal unit 15 in a direction for moving the valve head 8 closer to the valve port 4 for narrowing the drain passageway through the valve port 4. Such narrowing of the drain passageway causes in turn an increase of the steam pressure of the piping system, and eventually the expansion of the bimetal unit. Such increased steam pressure of the piping system acts on the valve head so as to close the valve port 4 tightly.

When the valve port is closed completely, there are following relations among various pressures acting on the valve head.

A force to close the valve port, $$P_c = P_b + P_{st}$$
$$= P_b + (pst \times A)$$

A force to open the valve port, $$P_o = P_{sp}$$

Here, $P_b$ is the temperature-sensitive deflective force of the bimetal unit 15, $pst$ a difference of pressure between the inlet side and the outlet side of the valve port, $A$ the effective cross-sectional area of the valve port, $P_{st}$ the effective steam force acting on the valve head given by the product of $A$ and $pst$, and $P_{sp}$ the elastic force of the spring 14 acting in the direction to open the valve port.

If the condition of $P_c > P_o$ is retained, then the valve port 4 is kept closed. As the drain temperature is reduced, the temperature-sensitive mechanical deflective force $P_b$ is reduced accordingly, and eventually the above condition is reversed to $P_c < P_o$ to open the valve port. More particularly, if the temperature-responsive deflective force of the laminated bimetal unit is lowered in excess of a certain predetermined level, the closing force $P_c$ acting on the valve head 8 in the downward direction is surpassed by the elastic force of the spring 14 acting on the same valve head in the upward direction, and accordingly, the valve head 8 is raised upward away from the valve port 4. Once the valve head 8 has started to move upward from its closed position in tight contact with the valve port 4, the steam pressure in the drain chamber 5 is lowered suddenly due to the drain jet stream through the valve port toward the outlet opening, and the movement of the valve head 8 is accelerated toward its fully open position. Thus, the popping action of the valve head in the opening stroke is ensured.

In the bimetal steam trap of FIG. 2, the magnitude of the opening stroke of the valve head 8 can be adjusted by turning the adjustable screw 21, which is accompanied by the modifications in the extent of contraction and expansion of the spring 14, and the extent of the deflection of the laminated bimetal unit 15 is also altered similarly. In other words, the aforementioned adjustment of the opening stroke of the valve head 8 is carried out by modifying the characteristics of the control forces $P_b$ and $P_{sp}$ acting on the valve head. However, the steam pressure of a high pressure steam piping system is usually kept within a certain narrow range, and the steam pressure seldom varies widely from zero to the maximum allowable pressure, and hence, the adjusting unit of the steam trap, comprising the spring holder 18, the adjustable screw 21, and the fastening nut 22 to secure said adjustable screw, can be dispensed with in most cases.

FIG. 4 shows another embodiment of the steam trap according to the invention, which is similar to that of FIGS. 2 and 3, but having no means for adjusting the opening stroke of the valve head. FIG. 5 illustrates still another embodiment of the invention, which is further simplified by eliminating all external adjusting means of the steam trap of FIG. 4. Throughout those figures, the same parts of the steam trap are represented by the same reference numerals.

With the steam trap of FIG. 4, a drain guide 24 is used instead of the spring holder 18 of the steam trap of FIG. 2, and the spring member 14, comprising a cylindrical spring in this embodiment, is directly connected to the valve seat ring 9. In the case of the steam trap of FIG. 5, an upper end cover 25 is provided to the drain guide 24 having a plurality of windows 26, and the valve stem guide cylinder 16 is in turn screwed to the upper end cover 25, and an annular spring 14 is inserted between the flange 12 at the upper end of the holding screw 11 for fastening the valve head 8 and the flanged portion of the drain guide 24.

The operative principles of the simplified steam traps, as shown in FIGS. 4 and 5, are apparent for those skilled in the art. Therefore, no detailed descriptions thereof will be made herewith.

As described in the foregoing, according to the invention, the valve head 8 is brought into contact with the valve port from the inlet side of the valve port to enable the movement of valve head without penetrating the valve stem through the valve port. With the valve construction of the invention, it is made possible to reduce the impulsive shocks of the drain jet streams discharged through the valve port 4, and accordingly, the erosion of the valve head 8 can be substantially reduced. Furthermore, the cross-sectional area of the valve port 4 can be reduced to enable the use of a small bimetal unit having a small mechanical deflective force, and hence, the cost of the steam trap can be reduced. In addition, the reliable popping action of the valve head is ensured by utilizing the steam pressure of the piping system as a force to close the valve port in conjunction with a separate spring as a source of the biasing force in the direction to open the valve port. The popping action of the valve head facilitates further reduction of the erosion of valve head. In short, the invention contributes greatly to the industry by enabling economical production of an improved bimetal steam trap having excellent durability in conjunction with reliable and distinctive operative characteristics.

What I claim is:

1. A bimetal steam trap for a high pressure steam system, comprising a casing including an inlet opening and an outlet opening, a partitioning wall having a valve port for dividing the inside space of the casing into two sections communicating with each other only through the valve port, a drain chamber formed within said casing on the inlet opening side thereof, a valve member including a valve head adapted to be brought into direct contact with said valve port in the line of fluid flow so as to close the valve port, the closing of said valve being caused mainly by the effective overall pressure of the fluid acting on said valve head, a spring member disposed between said partitioning wall and said valve member so as to bias said valve head against the pressure of the fluid, the magnitude of said spring-biasing force being slightly larger than that of the effective pressure of the fluid, and a temperature-sensitive bimetal unit disposed between said casing and said valve member in such a manner that the temperature-responsive deflective force of the bimetal unit is applied to said valve to open and close said valve port in response to the temperature sensed by the bimetal unit.

2. A bimetal steam trap according to claim 1 and further comprising an adjustable screw mounted on the upper end of said casing, wherein said bimetal unit is inserted between the lower end of said adjustable screw and said valve member in such a manner that the magnitude of said temperature-responsive deflective force of said bimetal unit may be regulated by turning said adjustable screw.

3. A bimetal steam trap according to claim 1 and further comprising a drain guide cylinder secured to said partitioning wall so as to enclose and valve members, wherein an adjustable screw is secured to the upper end of said drain guide, and said bimetal unit is inserted between the lower end of said adjustable screw and said valve member in such a manner that said temperature-responsive deflective force of said bimetal unit may be regulated by turning said adjustable screw.

References Cited

UNITED STATES PATENTS

| | | | |
|---|---|---|---|
| 1,288,296 | 12/1918 | Trane | 236—59 |
| 1,527,884 | 2/1925 | Lawler | 236—58 |
| 2,964,243 | 12/1960 | Jorgensen | 236—59 |
| 3,226,026 | 12/1965 | Domm | 236—59 |

WILLIAM J. WYE, *Primary Examiner.*